(12) United States Patent
Song et al.

(10) Patent No.: US 7,401,619 B2
(45) Date of Patent: Jul. 22, 2008

(54) AIR VALVE DEVICE FOR AN INFLATABLE ARTICLE

(76) Inventors: Rong-Jyh Song, 8F-1, No. 102, Sec 2, Roosevelt Rd., Taipei (TW); Tsung-Ping Yen, 8F-1, No. 102, Sec 2, Roosevelt Rd., Taipei (TW)

( * ) Notice: Subject to any disclaimer, the term of this patent is extended or adjusted under 35 U.S.C. 154(b) by 168 days.

(21) Appl. No.: 11/497,679

(22) Filed: Aug. 1, 2006

(65) Prior Publication Data

US 2008/0029166 A1    Feb. 7, 2008

(51) Int. Cl.
*F16K 15/20* (2006.01)
(52) U.S. Cl. .................. 137/223; 137/234.5; 137/542; 251/101
(58) Field of Classification Search .......... 137/223, 137/234.5, 540, 542; 251/101, 149.6, 297
See application file for complete search history.

(56) References Cited

U.S. PATENT DOCUMENTS 2,887,120 A * 5/1959 De See .................. 137/223
3,207,172 A * 9/1965 Steer et al. ............. 137/234.5
7,195,029 B2 * 3/2007 Wass .......................... 137/223
2003/0066559 A1 * 4/2003 Wass .......................... 137/223

* cited by examiner

*Primary Examiner*—Ramesh Krishnamurthy
(74) *Attorney, Agent, or Firm*—Christie, Parker & Hale, LLP

(57) ABSTRACT

An air valve device is adapted to be fitted into an opening of an inflatable article, and includes a valve seat formed with a valve body that is disposed between an inflating port and a conduit, an axially movable member having a valve disc which is disposed in the conduit to be moved between open and closed positions, and a plunger which is connected to the valve disc and which has a head end disposed in the inflating port, a biasing member disposed to bias the valve disc to the closed position, and a releasably retaining mechanism disposed between the valve seat and the plunger to arrest axial movement of the movable member against the biasing action of the biasing member when the valve disc is in the open position, thereby facilitating inflation and deflation of the inflatable article.

6 Claims, 6 Drawing Sheets

AIR VALVE DEVICE FOR AN INFLATABLE ARTICLE

BACKGROUND OF THE INVENTION

1. Field of the Invention

This invention relates to an air valve device for an inflatable article, more particularly to an air valve device which facilitates deflation of an inflatable article.

2. Description of the Related Art

Referring to FIGS. 1 and 2, a conventional air valve device 1 is generally used for an inflatable article (not shown), such as a swimming ring, an air cushion, etc., and is shown to include a valve seat 1, a movable member 4, a biasing member 2, and an end cap 3. The valve seat 1 includes a seat body 11, upper and lower tubular walls 12, 13 extending upwardly and downwardly from the seat body 11, respectively, and a lower plate 14 connected to the lower tubular wall 13 and spaced apart from the seat body 11. The seat body 11 has a central mounting hole 111 and four communicating holes 112 arranged around the central mounting hole 111. The lower tubular wall 13 has a plurality of passage holes 131. The movable member 4 includes a plunger 41 which has a connected end 43 that extends through the mounting hole 111 to engage a valve disc 44, and a head 42 that is operable to move the valve disc 44 from a closed position, as shown in FIG. 2, where the valve disc 44 is in air-tight engagement with the seat body 11 to shut off the communicating holes 112, to an open position, where the valve disc 44 is disengaged from the seat body 11 to permit air to flow through the communicating holes 112, and a seal ring 441 which is attached to the valve disc 44 to ensure air-tight engagement between the valve disc 44 and the seat body 11. The biasing member 2 is disposed to surround the plunger 41 so as to bias the movable member 4 to the closed position. The end cap 3 includes a cap body 31 and a connecting strip 32 to openably close the upper tubular wall 12. Since the valve disc 44 is moved to the open position against the biasing action of the biasing member 2, the plunger 41 has to be held in a depressed state during inflation and deflation of the inflatable article, especially during deflation, which is inconvenient to the user.

SUMMARY OF THE INVENTION

The object of the present invention is to provide an air valve device which can facilitate inflation and deflation of an inflatable article.

According to this invention, the air valve device includes a valve seat which has a tubular wall that surrounds and extends along an axis and that defines an accommodation space, and an abutment mount that is disposed to extend from the tubular wall radially and towards the axis to form a seat body. The seat body is configured to divide the accommodation space into an inflating port and a conduit, and has a communicating port to fluidly communicate the inflating port with the conduit. The valve seat further has a hub member which is connected to the tubular wall through the seat body, and which defines therein a mounting hole that extends along the axis to communicate the inflating port with the conduit. A movable member includes a valve disc and a plunger. The valve disc is disposed in the conduit and is movable relative to the abutment mount along the axis between a closed position, where the valve disc is in air-tight engagement with the seat body to shut off the communicating port, and an open position, where the valve disc is disengaged from the seat body to permit air to flow through the communicating port to enter into or escape from the inflatable chamber. The plunger has a connected end which is disposed in the conduit and which is connected to the valve disc, and a rod portion which extends from the connected end along the axis through the mounting hole and which terminates at a head end that is disposed in the inflating port such that movement of the plunger along the axis relative to the abutment mount results in movement of the valve disc between the closed and open positions. A biasing member is disposed to bias the head end to move away from the seat body so as to permit the valve disc to be held in the closed position. A releasably retaining mechanism is disposed between the hub member and the rod portion to arrest axial movement of the movable member relative to the abutment mount against biasing action of the biasing member when the valve disc is in the open position.

BRIEF DESCRIPTION OF THE DRAWINGS

Other features and advantages of the present invention will become apparent in the following detailed description of the preferred embodiment of the invention with reference to the accompanying drawings, in which.

DETAILED DESCRIPTION OF THE PREFERRED EMBODIMENT

Figure 1:
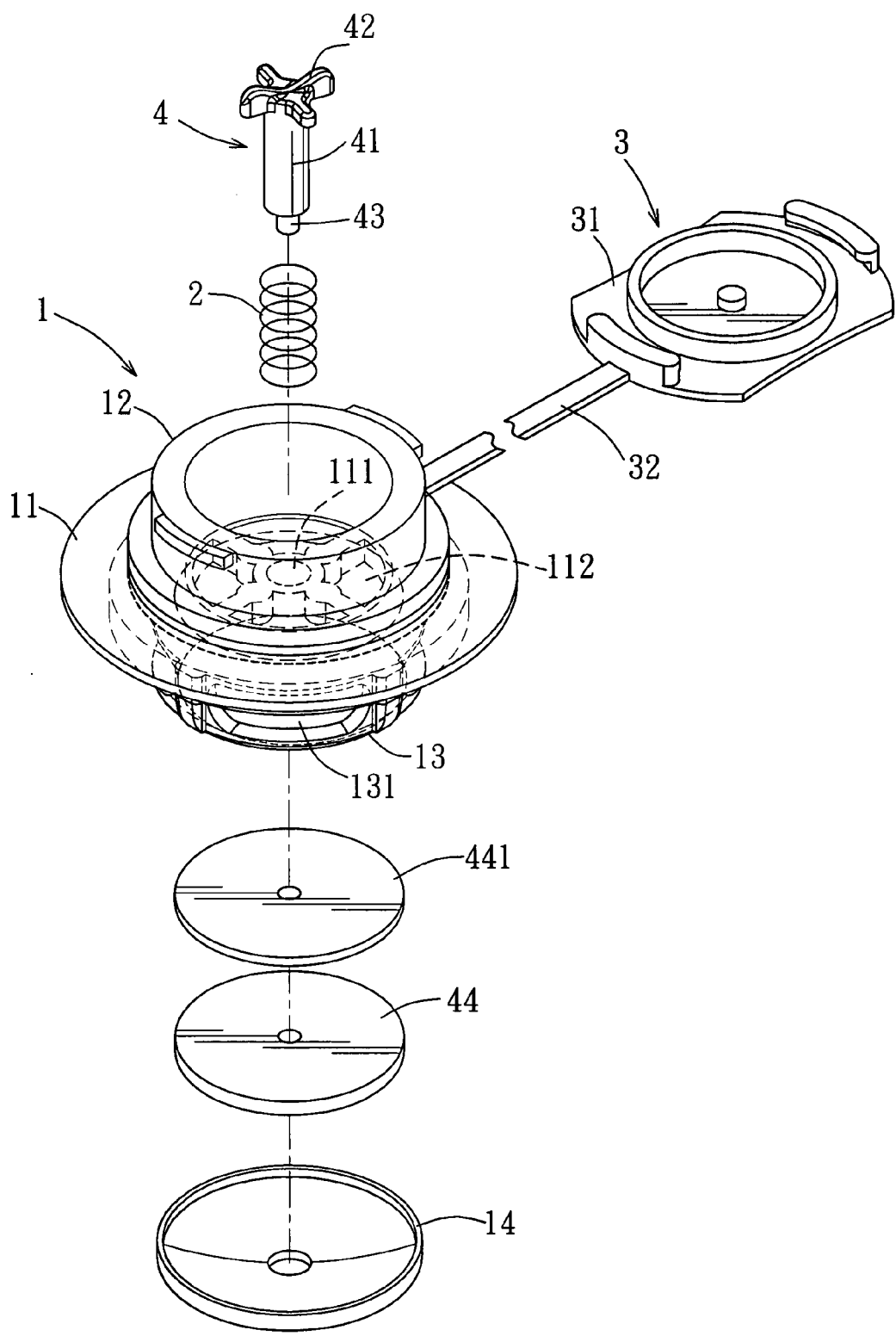
FIG. 1 is an exploded perspective view of a conventional air valve device.
Figure 2:
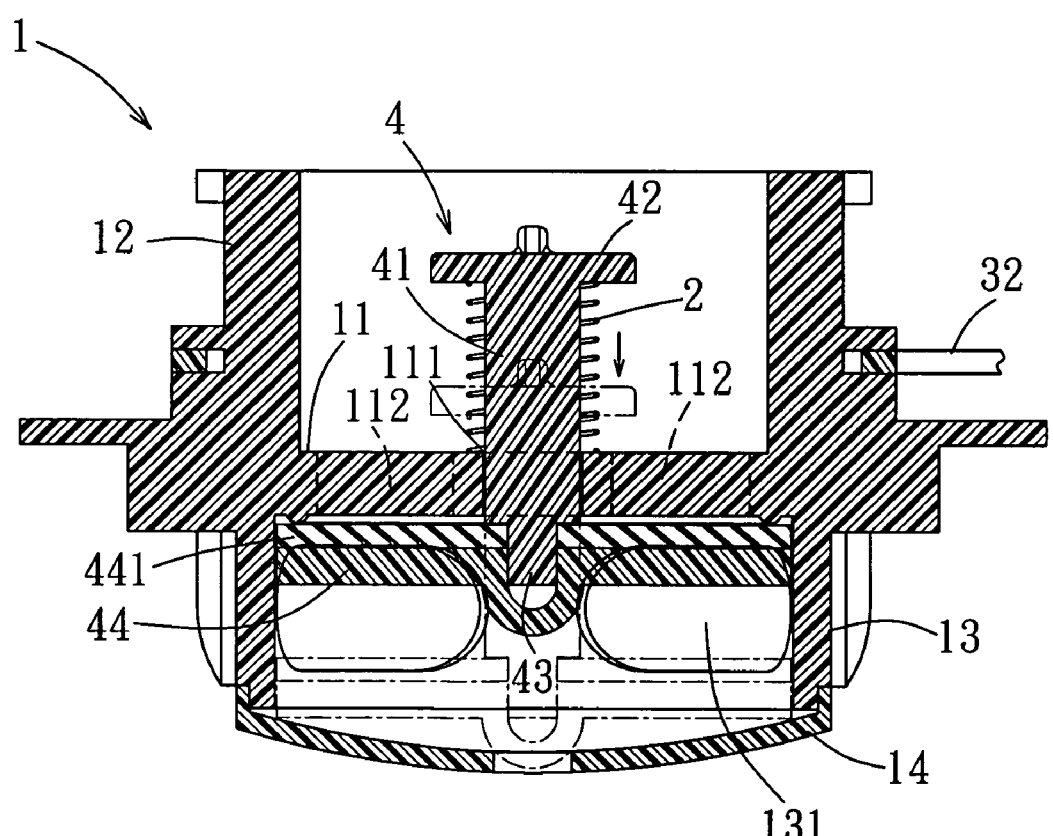
FIG. 2 is a sectional view of the conventional air valve device in an open position.
Figure 3:
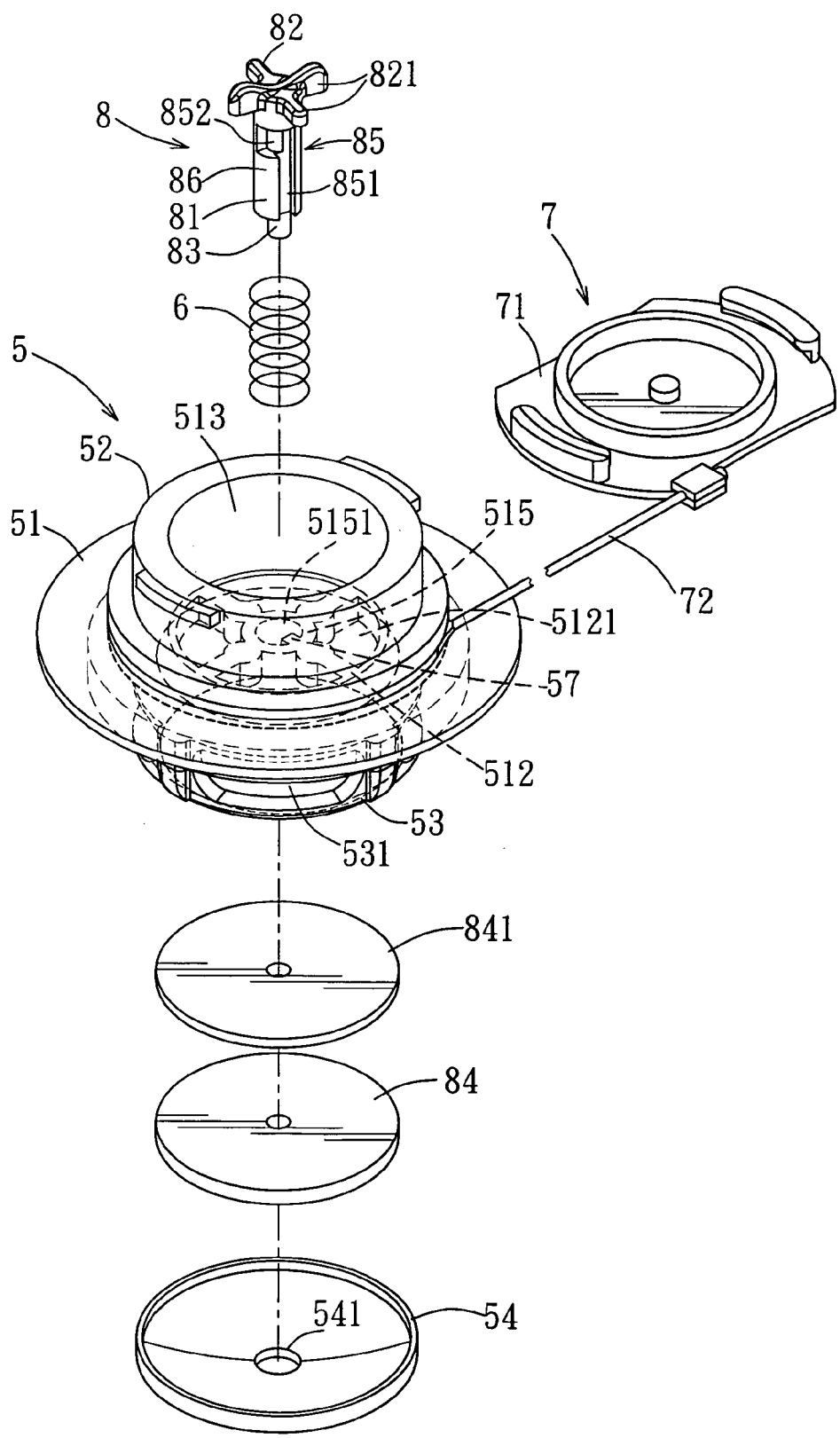
FIG. 3 is an exploded perspective view of the preferred embodiment of an air valve device according to this invention.
Figure 4:
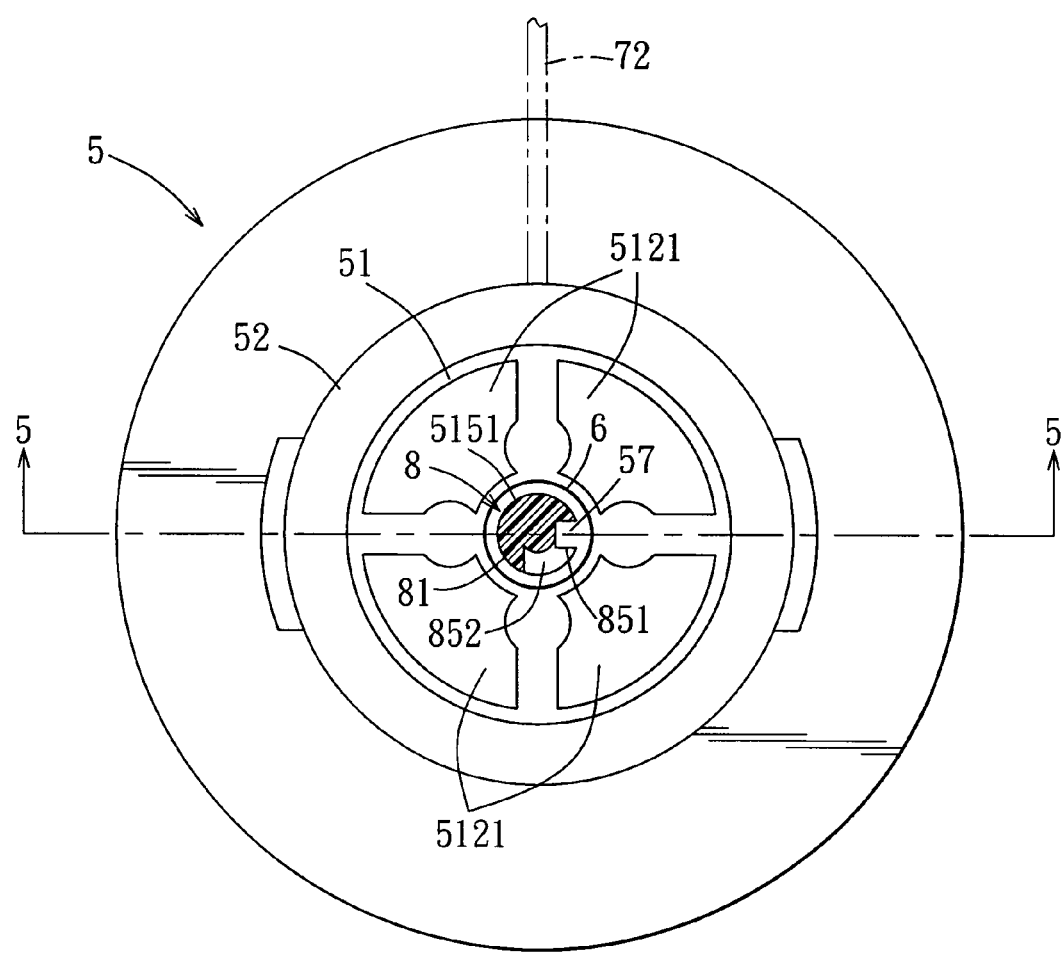
FIG. 4 is a partially sectioned fragmentary top view of the preferred embodiment.
Figure 5:
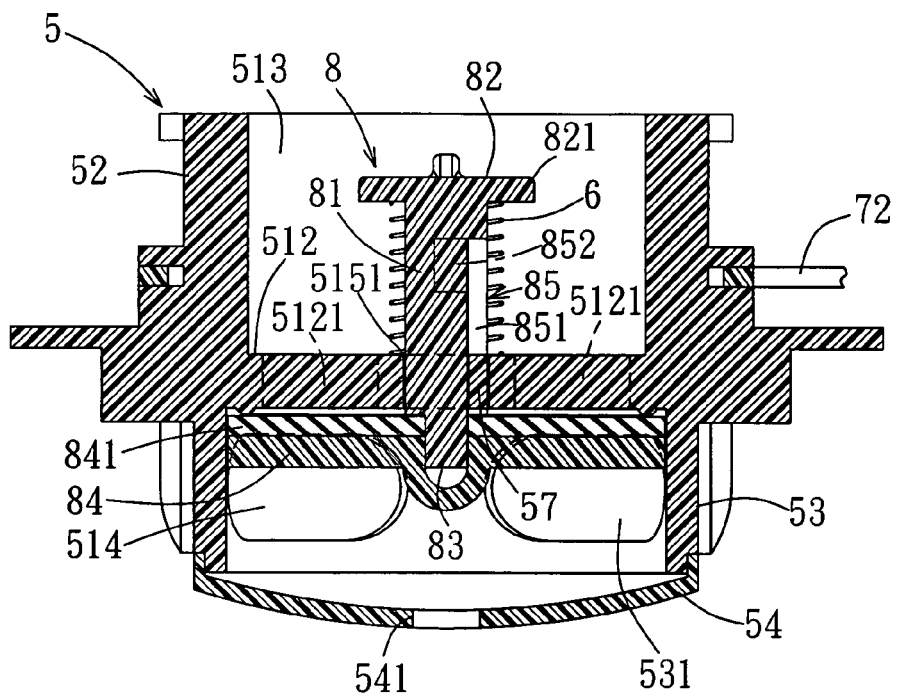
FIG. 5 is a cross-sectional view of the preferred embodiment taken along lines 5-5 of FIG. 4 when a valve disc is in a closed position.

Referring to FIGS. 3 to 5, the preferred embodiment of an air valve device according to the present invention is shown to comprise a valve seat 5, a movable member 8, a biasing member 6, a releasably retaining mechanism, and a cap 7. The valve seat 5 is adapted to be fitted into an opening of an inflatable article (not shown), and has a tubular wall 52 which surrounds and extends along an axis and which defines an accommodation space to be fluidly communicated with an inflatable chamber in the inflatable article, and an abutment mount 51 which is disposed to extend from the tubular wall 52 radially and towards the axis to form a seat body 512. The seat body 512 is configured to divide the accommodation space into an inflating port 513 distal from the inflatable chamber and a conduit 514 proximate to the inflatable chamber, and has a plurality of communicating ports 5121 to fluidly communicate the inflating port 513 with the conduit 514. The valve seat 5 further has a hub member 515 which is connected to the tubular wall 52 through the seat body 512, and which defines therein a mounting hole 5151 that extends along the axis to communicate the inflating port 513 with the conduit 514. A lower wall portion 53 of the tubular wall 52 has a plurality of communicating holes 531 formed therethrough to be fluidly communicated with the conduit 514. A caged guard member 54 is disposed to engage the lower wall portion 53 so as to enclose the conduit 514.

Figure 6:
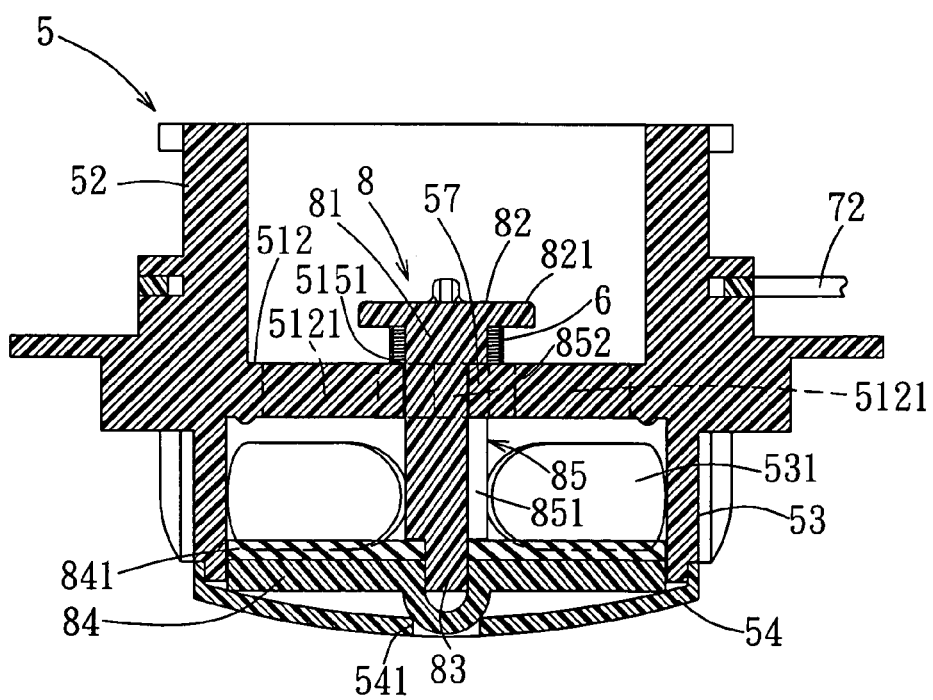
FIG. 6 is a view similar to FIG. 5, but showing the valve disc in an open position.

The movable member 8 includes a valve disc 84 and a plunger 81. The valve disc 84 is disposed in the conduit 514 and is movable relative to the valve body 512 along the axis between a closed position, as shown in FIG. 5, where the valve disc 84 is in air-tight engagement with the seat body 512 to shut off the communicating ports 5121, and an open position, as shown in FIG. 6, where the valve disc 84 is disengaged from the seat body 512 to permit air to flow through the communicating ports 5121 to enter into or escape from the inflatable chamber. Preferably, a seal ring 841 made from an elastomeric material is disposed between the valve disc 84 and the valve body 512 so as to ensure air-tight engagement of the valve disc 84 with the seat body 512 when the valve disc 84 is in the closed position. The plunger 81 has a connected end 83 which is disposed in the conduit 514 and which is connected to the valve disc 84, and a rod portion 86 which extends from the connected end 83 along the axis through the mounting hole 5151 and which terminates at a head end that is disposed in the inflating port 513 such that movement of the plunger 81 along the axis relative to the valve body 512 results in movement of the valve disc 84 between the closed and open positions. The plunger 81 further has a plunger head 82 which includes four grip protrusions 821 that extend from the head end of the rod portion 86 in radial directions relative to the axis.

The biasing member 6 is a coil spring which surrounds the rod portion 86 and which has two opposite ends abutting against the hub member 515 and the plunger head 82, respectively, so as to bias the plunger head 82 to move away from the hub member 515, thereby permitting the valve disc 84 to be held in the closed position.

Figure 7:
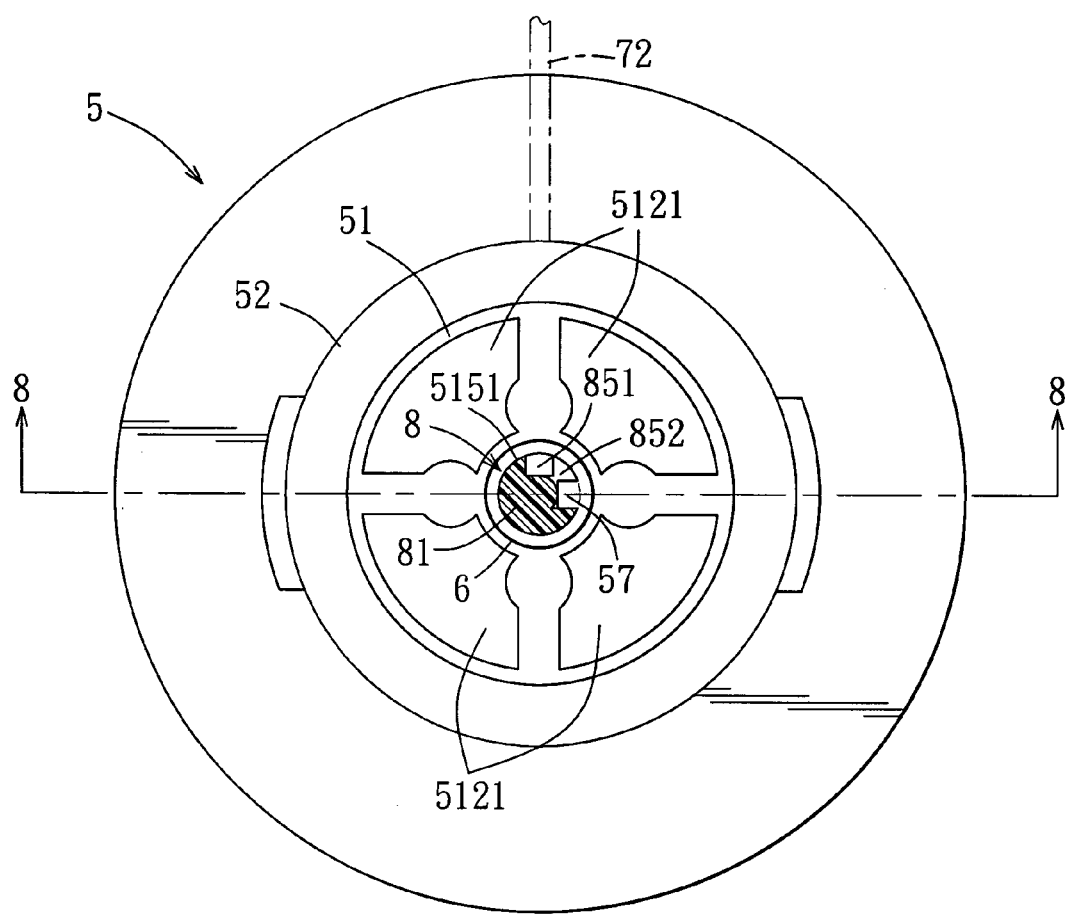
FIG. 7 is a view similar to FIG. 4, but showing a plunger in a depressed state and turned about an angle.
Figure 8:
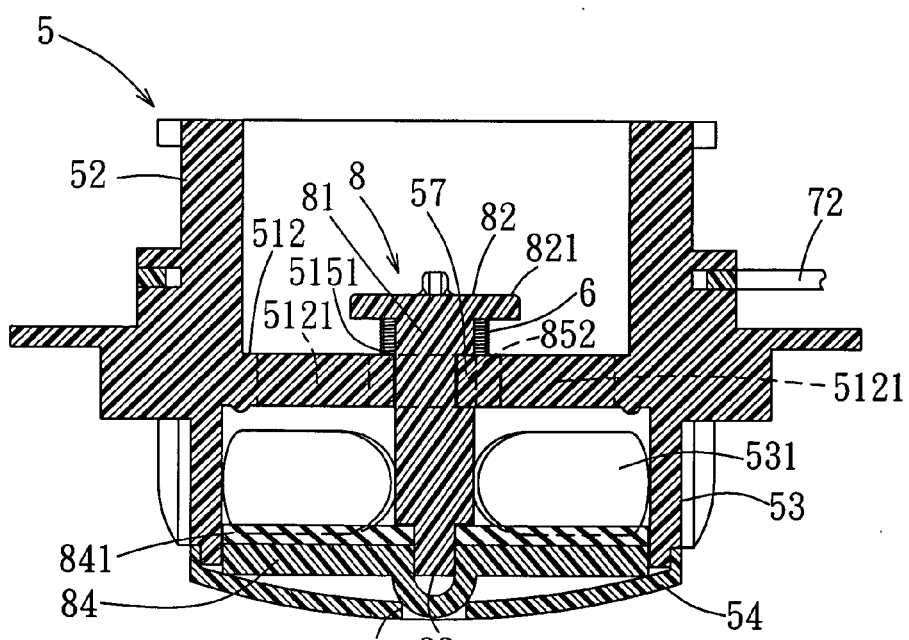
FIG. 8 is a cross-sectional view of the preferred embodiment taken along lines 8-8 of FIG. 7.

The releasably retaining mechanism includes an engaging peg 57 which is disposed on the hub member 515, and a retaining groove 85 which is formed in the rod portion 86. The retaining groove 85 includes a sliding groove segment 851 which extends from the connected end 83 in an axial direction parallel to the axis to permit the engaging peg 57 to engage the sliding groove segment 851 and to be slidable along the sliding groove segment 851 so as to move the valve disc 84 to the open position against the biasing action of the biasing member 6, as shown in FIGS. 4 to 6, and a retaining groove segment 852 which extends circumferentially from the sliding groove segment 851, and which is configured such that in the open position, when the movable member 8 is turned about the axis relative to the hub member 515, the engaging peg 57 is brought to be retained in the retaining groove segment 852, as shown in FIGS. 7 and 8. Moreover, the caged guard member 54 has an engaging area 541 disposed to be spaced apart from the connected end 83 of the plunger 81 in the axial direction. Thus, when the valve disc 84 is moved to the open position, it is brought to engage the engaging area 831 to thereby indicate that the valve disc 84 has reached the open position.

A cap 7 includes a cap member 71 which is disposed to openably close the inflating port 513, and a connecting strip 72 which extends to interconnect the tubular wall 52 and the cap member 71.

As illustrated, the movable member 8 can be depressed so as to be moved to the open position and can be turned about an angle to permit the engaging peg 57 to be retained in the retaining groove segment 852 so as to arrest the valve disc 84 in the open position, thereby facilitating deflation and inflation of the inflatable article.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. An air valve device for an inflatable article which has an inflatable chamber and an opening fluidly communicated with the inflatable chamber, comprising:
    a valve seat which is adapted to be fitted into the opening, and which has a tubular wall that surrounds and extends along an axis and that defines an accommodation space, and an abutment mount that is disposed to extend from said tubular wall radially and towards the axis to form a seat body, said seat body being configured to divide said accommodation space into an inflating port distal from the inflatable chamber and a conduit proximate to the inflatable chamber, and having a communicating port to fluidly communicate said inflating port with said conduit, said valve seat further having a hub member which is connected to said tubular wall through said seat body, and which defines therein a mounting hole that extends along the axis to communicate said inflating port with said conduit;
    a movable member including
        a valve disc which is disposed in said conduit and which is movable relative to said abutment mount along the axis between a closed position, where said valve disc is in air-tight engagement with said seat body to shut off said communicating port, and an open position, where said valve disc is disengaged from said seat body to permit air to flow through said communicating port to enter into or escape from the inflatable chamber, and
        a plunger having a connected end which is disposed in said conduit and which is connected to said valve disc, and a rod portion which extends from said connected end along the axis through said mounting hole and which terminates at a head end that is disposed in said inflating port such that movement of said plunger along the axis relative to said abutment mount results in movement of said valve disc between the closed and open positions;
    a biasing member disposed to bias said head end to move away from said seat body so as to permit said valve disc to be held in the closed position; and
    a releasably retaining mechanism which is disposed between said hub member and said rod portion to arrest axial movement of said movable member relative to said abutment mount against biasing action of said biasing member when said valve disc is in the open position.

2. The air valve device of claim 1, wherein said releasably retaining mechanism includes an engaging peg which is disposed on said hub member, and a retaining groove which is formed in said rod portion and which includes a sliding groove segment that extends from said connected end in an axial direction parallel to the axis to permit said engaging peg to engage said sliding groove segment and to be slidable along said sliding groove segment so as to move said valve disc to the open position, and a retaining groove segment that extends circumferentially from said sliding groove segment, and that is configured such that in the open position, when said movable member is turned about the axis relative to said hub member, said engaging peg is brought to be retained in said retaining groove segment.

3. The air valve device of claim 1, wherein said plunger further has a plunger head which extends from said head end in radial directions relative to the axis, said biasing member being a coil spring which surrounds said plunger and which has two opposite ends abutting against said abutment mount and said plunger head, respectively, so as to bias said plunger head to move away from said abutment mount.

4. The air valve device of claim 1, further comprising a seal ring which is made from an elastomeric material, and which is disposed between said valve disc and said valve body so as to ensure air-tight engagement of said valve disc with said seat body when said valve disc is in the closed position.

5. The air valve device of claim 1, further comprising a cap member which is disposed to openably close said inflating port, and a connecting strip which extends to interconnect said tubular wall and said cap member.

6. The air valve device of claim 1, further comprising a caged guard member which is disposed to enclose said conduit, and which has an engaging area disposed to be spaced apart from said connected end of said plunger in an axial direction parallel to the axis such that when said valve disc is moved to the open position, said valve disc is brought to engage said engaging area to indicate that said valve disc has reached the open position.

* * * * *